May 2, 1961 P. A. LINCOLN 2,982,376
AIR LINE LUBRICATOR

Filed Feb. 24, 1958 2 Sheets-Sheet 1

INVENTOR
PAUL A. LINCOLN
BY
HIS ATTORNEY

United States Patent Office

2,982,376
Patented May 2, 1961

2,982,376

AIR LINE LUBRICATOR

Paul A. Lincoln, Bloomsbury, N.J., assignor to Ingersoll-Rand Company, New York, N.Y., a corporation of New Jersey Filed Feb. 24, 1958, Ser. No. 717,083

8 Claims. (Cl. 184—55)

This invention relates generally to pneumatic tools, and more particularly to a lubricator in the pressure line for the tool. The lubricator is adapted to meter lubricant into the pressure line for lubricating the working parts of the tool.

An object of the invention is to provide a line lubricator which assures addition of lubricant into the air stream to the tool.

Another object is to provide a line lubricator which automatically operates when pressure air flows therethrough.

Another object is to provide a line lubricator in which the flow of lubricant into the air stream can be regulated proportionally to the requirements of the tool.

A further object is to provide a line lubricator in which the flow of lubricant is cut off when the air flow ceases.

Another object is to provide a line lubricator which will operate efficiently in any position of use.

A further object is to provide a line lubricator which is simple in structure, reliable in operation, conveniently installed and which can be easily serviced.

These and other objects and features of the invention will be apparent from the following specification when read in conjunction with the accompanying drawings, wherein.

Figure 1:
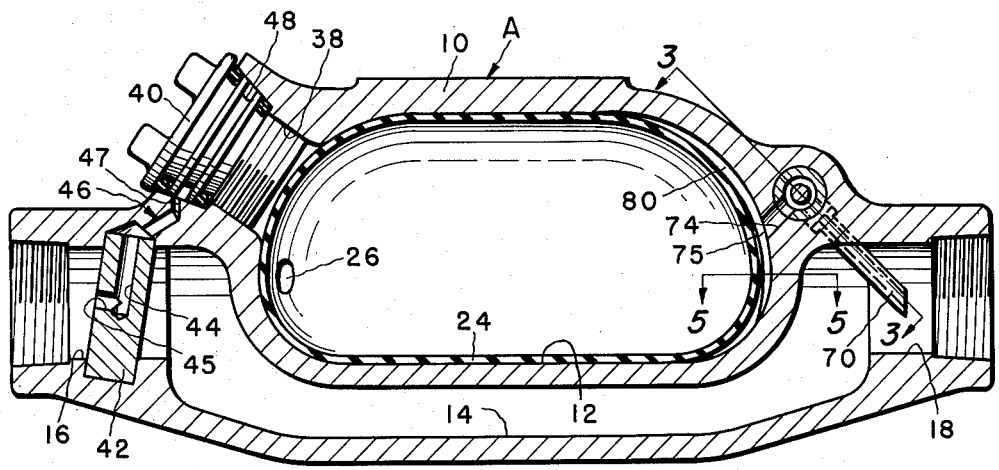
Figure 1 is a longitudinal section of an embodiment of the invention.
Figure 2:
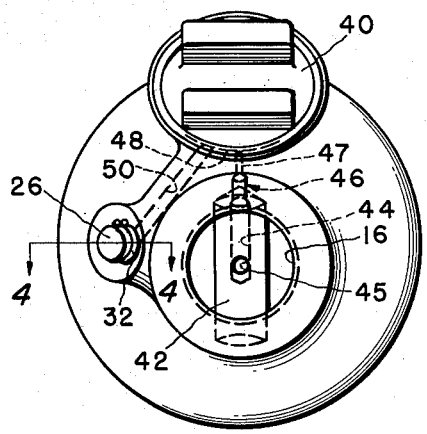
Fig. 2 is a front view of Fig. 1.
Figure 3:
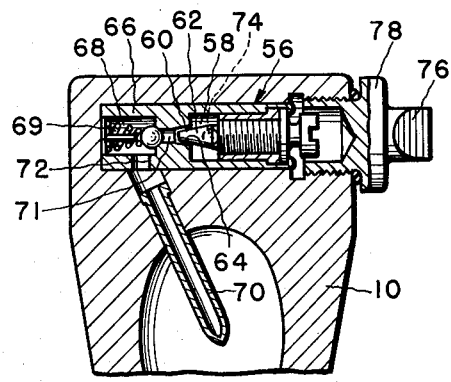
Figure 4:
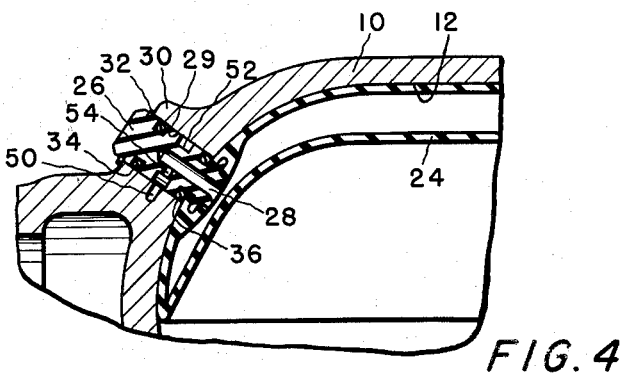
Figure 5:
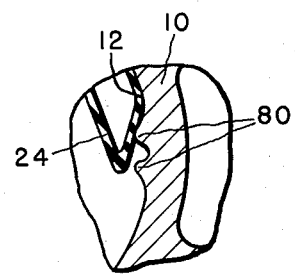
Figure 6:
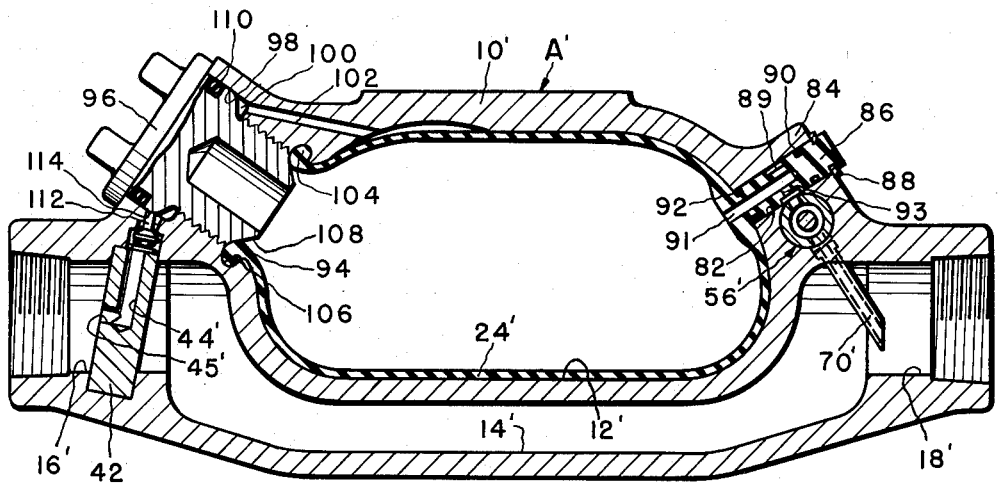

Fig. 3 is a cross sectional view along the line 3—3 of Fig. 1 looking in the direction of the arrows, Fig. 4 is a cross sectional view along the line 4—4 of Fig. 2 looking in the direction of the arrows, Fig. 5 is a cross sectional view along the line 5—5 of Fig. 1 looking in the direction of the arrows, and Fig. 6 is a longitudinal section of a modified embodiment of the line lubricator.

Referring now to the drawing, Fig. 1 shows a line lubricator A comprising a body 10 which forms a lubricant chamber 12 having a pressure air conduit 14 extending longitudinally adjacent the lubricant chamber 12 substantially parallel to the longitudinal axis thereof. The pressure air conduit 14 is provided with an inlet and outlet 16 and 18, respectively, and threaded for connecting the line lubricator into a pressure air line (not shown) for delivering compressed air to a pneumatic tool (not shown).

As shown in Fig. 1, the shape of the chamber 12 in longitudinal section is somewhat oval and within this chamber 12 is disposed an inflatable bladder 24 of a resilient oil resistant material, such as Buna "N" rubber. When inflated, the bladder 24 expands and its outer wall will occupy the entire inner wall of the chamber 12, and when deflated, the bladder 24, by reason of its structure, will automatically collapse and take its original form as illustrated in Fig. 4.

The bladder 24 is provided with a vulcanized plug member 26 which serves as a means to fasten the bladder 24 to the chamber 12 and has a passage 28 to conduct pressure air into the bladder 24. Fig. 4 illustrates the manner in which the plug member 26 is fastened in the chamber 12 and shows a hole 29, drilled in a boss 30 of the body 10, into which the plug member 26 is inserted. A snap ring 32, positioned at the upper end of the plug member 26, keeps the bladder 24 in place and the O-rings 34 and 36, recessed in the outer periphery of the plug member 26, provide for an air tight fitting of the plug member 26 in the hole 29.

As shown in Fig. 1, the chamber 12 is provided with an inlet 38, through which the chamber 12 can be filled, and a closure plug 40 which serves not only to close the inlet 38 but also, when screwed in place, to act as a link to conduct pressure air from the inlet 16 of the conduit 14 into the bladder 24.

Transversely positioned in the inlet 16 of the line lubricator A is a pin 42 acting as an obstruction in the air stream flowing from the inlet 16 through the conduit 14. This obstruction serves to create an area of increased pressure in the inlet 16 upstream relative to the pressure downstream of the pin 42.

It will be apparent that the area of increased pressure may also be created by forming a venturi in the upstream portion of the conduit 14 and it is to be understood that the embodiment of the invention is not to be restricted to the manner of creating an area of increased pressure as specified herein.

A passage 44 is drilled in the pin 42 having its inlet 45 in the area of increased pressure and facing the downstream flow of pressure fluid from the pressure line (not shown) into the inlet 16 of the conduit 14 and its other end opening into a passage 46. The passage 46 communicates the passage 44 with a circular groove 48 provided in the upper end of the closure plug 40, and as illustrated in Fig. 2, a passage 50 communicates the groove 48 with a groove 52 provided in the plug member 26. Fig. 4 shows a passage 54 through which the air is conducted from the passage 50 through the groove 52, passage 54 and passage 28 into the bladder 24.

As mentioned before the chamber 12 serves to store a lubricant which is to be metered into the air stream flowing from the conduit 14 through the outlet 18 and into the air line (not shown). A metering device 56 has been provided for this purpose and serves as a means for regulating the rate of feed of lubricant into the air stream. In addition thereto the metering device 56 is adapted to cut off the feed of lubricant automatically whenever the air flow ceases, and will operate automatically whenever pressure air flows through the line lubricator A.

As shown in Fig. 3, the metering device 56 comprises a valve chamber 58 adapted to threadably mount a needle valve 60 having a conical head 62 which may be moved into and out of engagement with a valve seat 64 to adjust the flow area therebetween. The metering device 56 also comprises a check valve 66 and its spring 69 disposed in a chamber 68 which is in communication with the valve chamber 58 through a passage 71. The lubricant flowing from the chamber 68 is conducted through a passage 72 into a lubricant feed pipe 70 extending in the air stream flowing through the outlet 18 of the line lubricator A. The lubricant in the chamber 12 flows to the metering device 56 through a passage 74 which conducts the lubricant from the chamber 12 into the valve chamber 58. It is to be noted that the adjustable needle valve 60 may be screwed in and out with respect to the valve seat 64 by using the screw driver tip 76 which is conveniently provided at the back end of the plug 78.

It is believed to be clear from the aforementioned arrangement and from the figures that whichever position the line lubricator A is disposed in, the lubricant will be forced into the air stream by reason of the air pressure acting in the bladder 24 to force the lubricant out of the chamber 12 into the metering device 56 and into the air stream to the tool (not shown).

In operation, when pressure air is being fed to the pneumatic tool (not shown) through the line lubricator A, but the pneumatic tool (not shown) is not in operation, the pressure at the inlet 16 will be equal to that at the outlet 18. Assuming that the bladder 24 is deflated and the chamber 12 is filled with lubricant, then the position of the bladder 24 relative to the lubricant in the chamber 12 will be as illustrated in Fig. 4.

When the tool (not shown) is placed into operation, pressure air flowing through the inlet 16 is restricted by the obstruction in the form of the pin 42, creating an area of increased pressure in the inlet 16 relative to the pressure in the outlet 18 in which the lubricant feed pipe 70 is disposed. The pressure air entering the passage 44 will be conducted through the passage 46, the circular groove 48 in the cap 40, the passage 50 connecting the circular groove 48 with the circular groove 52 in the plug member 26, and through the passage 28 into the bladder 24.

The pressure in the bladder 24 is transmitted to the lubricant in the chamber 12 and causes the lubricant to be forced into the passage 74 and into the metering device 56. In the metering device 56 the flow of lubricant is regulated by the adjustable needle valve 60 and it is to be noted that the advantage of the present construction is that the position of the needle valve 60 to secure a desired metering of lubricant can be regulated without the necessity of stopping the flow of pressure air passing through the line lubricator A.

The lubricant, after entering the valve chamber 58, flows through passage 71 into the chamber 68 and thence through the passage 72 into the feed pipe 70 from where it is fed into the air stream flowing through the outlet 18 to the tool (not shown).

As shown in Fig. 1 the bladder 24, when inflated, is adapted to occupy the entire volume of the chamber 12 and by reason thereof can force out substantially all the lubricant stored in the chamber 12.

In order to prevent the expanding bladder from eventually shutting off the inlet 75 of the passage 74, ridges 80 on the inner wall of the chamber 12 have been provided adjacent the inlet 75 of the passage 74. When the bladder 24 is being inflated, the ridges 80 will prevent the bladder 24 from covering the inlet 75 of the passage 74.

When the chamber 12 is empty the refilling thereof can be done without cutting off of the flow of pressure air through the line lubricator A. As shown in Fig. 1 the passage 46 comprises a narrow portion 47 opening into the inlet 38 of the chamber 12, and when the closure plug 40 is removed the pressure air that is conducted through the passage 46 will be throttled in the narrow passage 47 such that no appreciable amount of air will escape to the outer atmosphere to affect the flow of pressure air through the conduit 14 and the functioning of the tool (not shown). Obviously, the narrow portion 47 of the passage 46, to permit refilling of the reservoir 12 without interrupting the operation of the tool (not shown), may be substituted for a check valve, however for practical and economical reasons the narrowing of the passage 46 has been adapted and proven to be a simple and efficient way of achieving substantially the same result as would have been achieved with the application of a check valve.

When the closure plug 40 is removed the pressure of the air inside the bladder 24 will be equal to that of the atmosphere and the bladder 24, being deflated, will assume, as shown in Fig. 4, its original form by reason of its construction. When the chamber 12 is refilled and the closure plug 40 is screwed in place, the line lubricator will automatically function and provide the lubricant for the working parts of the tool (not shown).

Referring to a modified embodiment of the invention, as illustrated in Fig. 6, it is to be noted that the only variation effected by the modification is the alternative to use the bladder as a lubricant reservoir having the lubricant in the bladder and the pressure air outside thereof. In the modified embodiment of the invention shown in Fig. 6, parts identical with parts described in Figs. 1–5 have been marked with similar but primed numbers.

Fig. 6 illustrates the manner in which the bladder 24' is attached in the chamber 12' of the body 10'. The bladder 24' is provided with a vulcanized plug member 86 which is inserted in a hole 82 drilled in a boss 84 of the body 10'. A snap ring 88, positioned at the upper end of the plug member 86, keeps the bladder 24' in place and the O-rings 90 and 92 provide for an air tight fit of the plug member 86 in the hole 82. A passage 91 in the plug member 86 having a side passage 93 leading into a circular groove 89 serves to communicate the bladder 24' with the metering device 56'.

The bladder 24' is provided with an inlet 94 through which the bladder 24' can be filled, and a closure plug 96 serves not only to close the inlet 94 but also, when screwed in place, to cooperate with the partly threaded opening 98 to form a circular passage 100 to communicate the passage 44' with a passage 102 leading into the chamber 12'. At the inlet 94 of the bladder 24' a bead like ridge 104 is formed fitting in a recess 106 and held in place by the plug member 86 which by reason of its tapered end 108 and pressure thereof on the ridge 104 provides an air tight seal to prevent pressure air from entering the bladder 24'. An O-ring 110 positioned in the upper part of the closure plug 96 provides an air tight seal to prevent pressure air from escaping to the atmosphere.

As clearly shown in Fig. 6 a check valve 112 is arranged in the passage 44' and adapted to cooperate with the closure plug 96 such that when the closure plug 96 is tightly closed the edge 114 thereof will force the check valve 112 in an open position to permit the pressure air from the passage 44' to flow through the circular passage 100 and the passage 102 into the chamber 12'.

In operation, when pressure air is being fed to the pneumatic tool (not shown) through the modified lubricator A', and assuming that the bladder 24' is filled with lubricant, pressure air flows into the inlet 45' and through the passage 44' past the check valve 112 and through the circular passage 100 and passage 102 into the chamber 12'. The pressure exerted on the outside of the bladder 24' will cause the lubricant therein to be forced out through the passage 91, passage 93 and circular groove 89 into the metering device 56'.

As explained before, the metering device 56' will regulate the rate of feed of lubricant into the air stream.

Whereas the invention has been specified as a device for introducing lubricant into an air stream under pressure, it is to be understood that this device may be used to introduce one fluid into another fluid under pressure.

It is to be understood that the invention, shown and described in connection with two embodiments, is not to be restricted to the details set forth since these may be modified within the scope of the appended claims without departing from the spirit and scope of the invention.

I claim:

1. In a line lubricator, the combination comprising a body having a lubricant reservoir therein, a supply port for the reservoir, an outlet for the reservoir, and a closure plug releasably secured in said supply port, a conduit separate from the reservoir extending through said body and having an inlet and an outlet for conducting pressure fluid, a collapsible bladder arranged within said reservoir adapted to be inflated to occupy the entire volume of said reservoir, said bladder adapted to collapse when deflated to permit the lubricant to occupy substantially the entire volume of said reservoir, means to restrict the flow of pressure fluid through a portion of the conduit to create on one side of said means an area of increased pressure relative to a lower pressure area on the other side of said means, a passage in the lubricator to communicate said conduit area of increased pressure with the supply port of the reservoir, a passage for communicating the supply port of the reservoir with the bladder, and a passage in the closure plug adapted to communicate the first and second said passages, a passage in the body for communicating the outlet of the reservoir with the lower pressure area of the conduit, and a valve in the last said passage to regulate the flow of lubricant therethrough.

2. The line lubricator claimed in claim 1 in which the passage in the lubricator to communicate the conduit area of increased pressure with the supply port of the reservoir includes means to restrict the flow of pressure fluid through said passage.

3. In a line lubricator, the combination comprising a body having a lubricant reservoir therein, a supply port for the reservoir, an outlet for the reservoir, and a closure plug releasably secured in said supply port, a conduit separate from the reservoir extending through said body and having an inlet and an outlet for conducting pressure fluid, a collapsible bladder arranged within said reservoir adapted to be inflated to occupy the entire volume of said reservoir, said bladder adapted to collapse when deflated to permit the lubricant to occupy substantially the entire volume of said reservoir, a member in said conduit to restrict the flow of pressure fluid through a portion of the conduit to create on one side of said member an area of increased pressure relative to a lower pressure area on the other side of said member, a passage in said member and in the body to communicate said conduit area of increased pressure with the supply port of the reservoir, a passage for communicating the supply port of the reservoir with the bladder, and a passage in the closure plug adapted to communicate the first and second said passages, a passage in the body for communicating the outlet of the reservoir with the lower pressure area of the conduit, a valve in the last said passage to regulate the flow of lubricant therethrough, a check valve in the last said passage to prevent back flow of pressure fluid from the conduit to the reservoir, and means provided in the reservoir to prevent shutting off of the outlet of the reservoir by the bladder.

4. The line lubricator claimed in claim 2 in which the last said means comprises ridges adjacent the outlet of the reservoir.

5. In a line lubricator, the combination comprising a body having a lubricant reservoir therein, a supply port for the reservoir, an outlet for the reservoir, and a closure plug releasably secured in said supply port, a conduit separate from the reservoir extending through said body having an inlet and an outlet for conducting pressure fluid, a collapsible bladder arranged within said reservoir adapted to be inflated to occupy the entire volume of said reservoir, said bladder adapted to collapse when deflated to permit the lubricant to occupy substantially the entire volume of said reservoir, a member in said conduit to restrict the flow of pressure fluid through a portion of the conduit to create an area upstream of said member of increased pressure relative to a pressure area downstream of said member, a passage in said member and in the body to communicate said conduit area of increased pressure with the supply port of the reservoir, and means in said passage to restrict the flow of pressure fluid therethrough, a passage for communicating the supply port of the reservoir with the bladder, and a passage in the closure plug adapted to communicate the passage from the supply port of the reservoir to the area of increased pressure with the passage from the supply port of the reservoir to the bladder, a passage in the body for communicating the outlet of the reservoir with the lower pressure area of the conduit, a valve in the last said passage to regulate the flow of lubricant therethrough, a check valve in the last said passage to prevent back flow of pressure fluid from the conduit to the reservoir, and means provided in the reservoir to prevent shutting off of the outlet of the reservoir by the bladder.

6. In a line lubricator, the combination comprising a body having a chamber therein, a collapsible bladder arranged within said chamber adapted when extended to occupy substantially the entire volume of such chamber, said bladder defining a second chamber, a lubricant supply port for one of said chambers, a conduit separate from the chambers extending through the body and having an inlet and an outlet for conducting pressure fluid, means to restrict the flow of pressure fluid through a portion of the conduit to create on one side of said means an area of increased pressure relative to a lower pressure area on the other side of said means, outlet means for said one chamber leading to such low pressure area of the conduit, a closure plug releasably secured to said supply port, a passage in the lubricator to communicate said conduit area of increased pressure with the other of said chambers, a valve in the first said outlet means to regulate the flow of lubricant therethrough, and means in the lubricator and cooperating with said passage for disrupting the flow of pressure fluid through such passage whenever the closure plug is removed.

7. The line lubricator claimed in claim 6 in which said passage includes a section which is destroyed by removal of the closure plug.

8. The line lubricator claimed in claim 6 in which lubricant is supplied to the said second chamber and pressure fluid is supplied to the first said chamber, and in which the bladder has an inlet opening positioned at said supply port and closed by the closure plug.

References Cited in the file of this patent

UNITED STATES PATENTS

| | | |
|---|---|---|
| 1,984,422 | Nell | Dec. 18, 1934 |
| 2,105,493 | Gartin | Jan. 18, 1938 |
| 2,439,053 | Moore | Apr. 6, 1948 |
| 2,604,189 | O'Farrell | July 22, 1952 |
| 2,702,094 | Maha | Feb. 15, 1955 |
| 2,897,919 | Dellner | Aug. 4, 1959 |